United States Patent [19]

Fujita

[11] Patent Number: 5,849,814
[45] Date of Patent: Dec. 15, 1998

[54] INK COMPOSITION

[75] Inventor: Hisanori Fujita, Osaka, Japan

[73] Assignee: Sakura Color Products Corporation, Osaka, Japan

[21] Appl. No.: 579,587

[22] Filed: Dec. 26, 1995

[30] Foreign Application Priority Data

Dec. 26, 1994 [JP] Japan ................................ 6-341080

[51] Int. Cl.$^6$ .................................................. C09D 11/00
[52] U.S. Cl. ........................ 523/161; 524/503; 524/524; 260/DIG. 38; 106/31.13; 106/31.34
[58] Field of Search ................... 523/161; 260/DIG. 38; 524/503, 524; 106/20 R, 27 R

[56] References Cited

U.S. PATENT DOCUMENTS 4,256,494  3/1981  Yamamoto et al. .................. 106/22 A

*Primary Examiner*—Vasu Jagannathan
*Assistant Examiner*—John J. Guarriello
*Attorney, Agent, or Firm*—Armstrong, Westerman, Hattori, McLeland & Naughton

[57] ABSTRACT

An ink composition according to the present invention comprises a pigment, a pigment dispersion resin, an non-aqueous ambient temperature non-volatile liquid removal agent and an non-aqueous ambient temperature volatile organic solvent, wherein the amount of the pigment dispersion resin relative to that of the pigment is within the range of from about 2 to about 10%. Methods of making the ink composition and methods of applying the ink composition to a writing board also are disclosed. The ink composition is superior in time-erasion performance independent of the object and/or surface of the writing board.

16 Claims, 3 Drawing Sheets

INK COMPOSITION

BACKGROUND OF THE INVENTION

1. Field of the Invention

The present invention relates to an ink composition useful for writing tools that are designed to write down especially on a colored writing board such as a black colored writing board or a green colored writing board.

2. Description of Related Art

Generally, a conventional ink composition useful for writing on colored writing boards comprises a pigment, a pigment dispersion resin, an ambient temperature non-volatile liquid removal agent and an ambient temperature volatile organic solvent. Because an ambient temperature volatile organic solvent will volatilize at room temperature, but an ambient temperature non-volatile liquid removal agent will not volatilize after application to a writing board, an ambient temperature non-volatile liquid removal agent layer usually is formed on the writing board and a film-like pigment dispersion resin layer including the pigment is formed on the removal agent layer. This ambient temperature non-volatile liquid removal agent layer then can be wiped off from the writing board by using an eraser made of felt, fiber bunch and the like to erase the handwritings.

Documents related to the present invention include, inter alia, Japanese Patent Publications (examined) Nos. Sho 44-17616, Sho 46-40290, Sho 47-29666, Sho 48-14690, a Japanese Patent Publication (unexamined) No. Sho 49-93123 and a Japanese Patent Publication (examined) No. Hei 5-71066, the disclosures of which are incorporated by reference herein in their entirety.

There are various kinds of writing boards having different object and/or surface conditions. Hence, the erasion performance of handwritings depends on the particular writing board on which the handwritings have been applied. The type of writing board is particularly important when a porous writing board such as a writing board coated with a melamine layer is used. With these porous boards, the non-volatile liquid removal agent is absorbed into the writing board because of the porous object thereof, and thus, the pigment dispersion resin layer directly adheres to the writing board. As a result, handwritings which are left for several weeks on the writing board cannot be erased by using an eraser made of felt, or the like. To erase such handwritings, alcohols or the like must be applied. Thus, conventional inks suffer in time-erasion performance.

Even when writing on non-porous writing boards, similar problems such as those mentioned above arise when a non-volatile liquid removal agent is diffused into the surface of the writing board and a pigment dispersion resin layer adheres thereto. Further, in conventional ink compositions, since an ambient temperature non-volatile liquid removal agent layer typically is formed on a writing board and a film-like pigment dispersion resin layer is formed thereon after application on a writing board to form handwritings, the handwritings look transparent in color which is inferior in opacifying effect. Thus, clear handwritings can not be obtained on a colored writing board other than a white writing board unless a large amount of pigment or titanium is contained in a pigment dispersion resin. However, such large amount of pigment or titanium increases the viscosity of an ink composition thereby lowering the writing performance.

SUMMARY OF THE INVENTION

In view of the foregoing disadvantages that are inherent in conventional ink compositions, the present invention aims at solving the above problems of an ink composition used for writing tools for application on a writing board.

An object of the present invention therefore is to provide an ink composition which is improved in time-erasion performance regardless of the object and/or surface of the writing board, especially a colored writing board such as a black colored writing board, a green colored writing board, etc. It further is an object to provide an ink composition that can obtain a clear handwriting especially on the above-mentioned colored writing boards because of an improved opacifying effect, and the ink composition also is improved in a writing performance.

In accordance with these and other objects of the present invention, there is provided an ink composition comprising a pigment, a pigment dispersion resin, a non-aqueous ambient temperature non-volatile liquid removal agent and a non-aqueous ambient temperature volatile organic solvent, wherein the amount of the pigment dispersion resin falls in a range of from 2 to 10 % by weight based on the weight of the pigment.

The ink composition according to the present invention is useful for application not only on a white writing board but also on a colored writing board, especially a black colored writing board, a green colored writing board, or the like.

The ink composition according to the present invention further is superior in time-erasion performance regardless of the object and/or surface of the writing board, can obtain a clear handwriting because of an improved opacifying effect, and is excellent in writing performance because a high concentration of pigment is not required as in a conventional ink composition.

More particularly, the present invention pertains to an ink composition improved in time-erasion performance and opacifying effect, wherein handwritings applied by the ink on the colored writing board or a white writing board (hereinafter referred to as a 'writing board' as a general term for these colored and white writing boards), can be erased by an eraser made of felt, etc.

In accordance with an additional object of the present invention, there is provided a method of making an ink composition comprising dissolving a pigment dispersion resin in an non-aqueous ambient temperature volatile organic solvent, and then adding to this solution a pigment particle, an non-aqueous ambient temperature non-volatile liquid removal agent and optionally other additives. This mixture then also can be dispersed using a dispersion means such as a bead mill, roller mill, and the like.

In accordance with a further object of the present invention, there is provided a method of applying an ink composition to a writing board comprising supplying a writing implement with an ink composition including a pigment, a pigment dispersion resin, a non-aqueous ambient temperature non-volatile liquid removal agent and a non-aqueous ambient temperature volatile organic solvent, wherein the amount of the pigment dispersion resin falls in a range of from 2 to 10% by weight based on the weight of the pigment. The ink composition then is applied from the writing implement to a writing board.

These and other objects of the present invention will be readily apparent to those skilled in the art upon review of the detailed description which follows.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENT

Figure 1:
FIG. 1 is a micrograph at 250 magnification showing a surface of a writing board, where the pigment to PVB weight ratio is 100:100.

Preferred embodiments of the present invention will now be described, in detail, with reference to the accompanying drawings.

Throughout this description, the phrase "ambient temperature non-volatile liquid removal agent" denotes a removal agent that will not volatilize at or about ambient or room temperature. In addition, the phrase "ambient temperature volatile organic solvent" denotes an organic solvent that will volatilize at or about ambient or room temperature. Throughout this description, the phrase "time-erasion performance" denotes the performance of the ink, after applying it to a writing board and permitting it to remain on the writing board for a period of time. The amount of work required to erase the writing after a period of time is an indicator of the "time-erasion performance" whereby less work indicates a superior time-erasion performance.

An ink composition according to the present invention typically comprises a pigment, a pigment dispersion resin, a non-aqueous ambient temperature non-volatile liquid removal agent and a non-aqueous ambient temperature volatile organic solvent, wherein the pigment dispersion resin is present in a range of from about 2 to about 10% by weight based on the weight of the pigment.

In a conventional ink composition, since an aqueous removal agent layer usually is formed between (i) the surface of a writing board and (ii) a handwriting film which is made of a pigment dispersion resin so as to enable erasion of the handwriting on the writing board, the time-erasion performance and the opacifying effect suffer from the disadvantages as mentioned above.

In a conventional ink composition which forms a continuous handwriting film including a pigment distributed in a large amount of pigment dispersion resin (about 50–250% of pigment weight), whereby the film is in an area contact with a surface of the writing board. In an ink composition according to the present invention, however, each pigment particle is wrapped by pigment dispersion resin so as not to form a continuous film, and a non-aqueous removal agent surrounds each pigment particle wrapped in pigment dispersion. Thus, a handwriting composed of fine-grains, which can improve the opacifying effect owing to chalking, can be obtained by the ink composition according to the present invention.

The ink composition of the present invention can be obtained by greatly decreasing the amount of pigment dispersion resin to that of pigment, unlike a conventional ink composition which uses a non-aqueous removal agent. As a result of examinations of the amount of the pigment dispersion resin relative to the amount of pigment, it turned out that the amount of the pigment dispersion resin usually should fall within a range of 2–10% by weight based on the amount of pigment. Advantageously, if the amount of one or more resins selected from a polyvinyl butyral (PVB) resin and a vinyl acetate-ethylene copolymer to the amount of pigment falls within a range of from about 2 to about 10%, preferably from about 2 to about 4.5%, and more preferably from about 3 to about 4.5% by weight, a grained layer is easily formed around each pigment particle. If the amount of the pigment dispersion resin to that of the pigment is less than 2 % by weight, the dispersion will be poor and the redispersion will be decreased. If the amount of the pigment dispersion to that of the pigment exceeds 10% by weight, the time-erasion performance of handwritings will be poor and the opacifying ratio will also be decreased.

In order to obtain an ink composition which forms handwritings composed of fine-grains representing a dot contact with a surface of a writing board, a removal agent layer should be formed around a grained layer of pigment dispersion resin similar to water contained in grains of sand. Hence, any ambient temperature non-volatile liquid removal agent can be used so long as the agent enables the formation of a removal agent layer formed around a grained layer of pigment dispersion resin. As a result of examinations of various kinds of ambient temperature non-volatile liquid removal agents, the most preferable ambient temperature non-volatile liquid removal agent is one or more non-aqueous non-volatile liquid removal agent selected from a fatty acid ester, a polyoxy propylene compound and a surfactant. The most preferable blending amount of the non-aqueous ambient ordinary temperature non-volatile liquid removal agent to the amount of the pigment is between about 20 to about 300% by weight, more preferably from about 30 to about 250%. If it exceeds 300%, drying of the handwriting will be delayed, and, consequently, the handwriting becomes hard to erase. Since the handwriting composed of fine-grains is buried in the non-aqueous ambient temperature non-volatile liquid removal agent to decrease the opacifying rate, the handwriting will be unclear on a colored writing board. On the other hand, if the amount of ambient temperature non-volatile liquid removal agent to the amount of pigment is less than 20% by weight, the handwriting becomes hard to erase because the amount of the removal agent is too small. The non-aqueous ambient temperature non-volatile liquid removal agent in the present invention may include not only a non-volatile liquid-like removal agent but also may include a non-volatile paste-like non-aqueous removal agent. If the ambient temperature non-volatile liquid removal agent as well as the ambient temperature volatile organic solvent are aqueous, the removal agent layer will not be formed around the grained layer of pigment dispersion resin. When using an aqueous removal agent, an agent layer will be temporarily formed around the grained layer of pigment dispersion resin. However, since water is evaporated, the grained layers will adhere with each other to lose a stable function as a removal agent layer. Non-aqueous ambient temperature non-volatile liquid removal agents therefore are preferred for use in the present invention.

Particularly preferred ambient temperature non-volatile liquid removal agents include fatty acid esters including, but not limited to, higher fatty acid esters, glycerin fatty acid esters, trimethylolpropane tri-fatty acid esters, ethyleneglycol difatty acid esters and mixtures thereof. Advantageously, as useful higher fatty acid esters, an isooctyl stearate, a cetyl isooctanoate, a butyl stearate, an isocetyl myristate and an octyldodecyl myristate are desirable. Moreover, as specific examples of useful trimethylolpropane tri-fatty acid esters, trimethylolpropane tri-lauric acid ester, a trimethylolpropane trioleic acid ester, a trimethylolpropane lauric acid, a stearic acid mixture triester and mixtures thereof are desirable. Polyoxypropylene (POP) compounds also are useful in the present invention and include, but are not limited to, POP conductors such as a polypropylene glycol-polyethylene glycol block copolymer, an alkylpolyoxypropyleneether, an alkyl polyoxypropylene polyoxyethylene, a fatty acid polyoxypropylenepolyoxyethyl ester and mixtures thereof. Suitable surfactants useful in the present invention include, but are not limited to, alkyl phosphoric acid esters, polyoxyethylene alkyl ether phosphates, sodium salts of polyoxyethylene alkyl ether phosphates, alkyl sulfates, polyoxyethylenealkyl sulfates, the alkyl salts of these and mixtures thereof. In addition, fatty acid soaps such as a potassium, sodium, and ammonium salts of an oleic acid can be used. In accordance with the present invention, it is possible to use each of the aforementioned compounds by itself or in combination with one or more of the other compounds.

As pigments, well-known pigments or coloring agents such as phthalocyanines, azo pigments, quinacridones, dioxanzines, indigoids, anthraquinones, perynone perylenes, diketo pyrrolo pyrroles, coumarone resins of fluorescent pigments and benzoguanamines of fluorescent pigments, and mixtures thereof can be used. Particularly preferred pigments which can be used in the present invention include, but are not limited to, an oxidation titanium, a carbon black, an indanthrene blue, a phthalocyanine blue, a phthalocyanine green, a benzoguanamines of fluorescent pigment (fluorescent pigment whose brand name is 'EPOCOLOR' made by Nippon Shokubai Kagaku Kogyo Co., Ltd), a Watchung red, a perinon orenge, a isoindoline and mixtures thereof.

The mixing amount of the pigment relative to the total weight of the composition preferably is 1–28% and more preferably 2–23%. If the amount of pigment exceeds 28%, the viscosity of the ink composition as a whole becomes higher, and consequently, handwritings will be apt to become patchy. If the amount of pigment is less than 1%, the coloring power is insufficient, and consequently, the handwriting will be obscure.

The non-aqueous ambient temperature volatile organic solvent is not particularly limited to specific solvents so long as it can dissolve a pigment dispersion resin and a non-aqueous ambient temperature non-volatile liquid removal agent and also evaporate promptly after application on a writing board or the like. Preferred organic solvents include, but are not limited to, ketone solvents such as an acetone, a methylethyl ketone, an alcoholic solvent such as a methyl alcohol, an ethyl alcohol, an isopropyl alcohol, a normal propyl alcohol, an alcoholic ether solvent such as an ethylene glycol monomethyl ether, an ethylene glycol monoethyl ether, a propylene glycol monoethyl ether, a propylene glycol monomethyl ether, and mixtures thereof. These solvents can be used as a single solvent or as mixed solvents, and preferably are used with an alcoholic solvent or a ketone solvent as a main solvent depending on the resin, etc. Those skilled in the art are capable of determining the appropriate non-aqueous ambient temperature volatile solvent to use in the present invention in accordance with the guidelines presented herein. When an organic solvent of a ketone solvent is used, the preferable amount relative to the total amount of the ink composition is about 40% by weight.

The ink composition according to the present invention can be mixed with a rust inhibitor, a mold inhibitor, a dry inhibitor, a silicon or fluorine surfactant, an acetylenic glycol conductor, etc. The ink composition according to the present invention also can preferably be used in a writing tool having a writing tip made of felt, fiber bunch, or the like, but is not limited to them. The ink composition then can readily be applied to a writing board by applying pressure to the writing tip as it is pressed against the writing board. The ink composition according to the present invention can be preferably used for the so-called 'ink free type' writing tool whereby an ink is directly filled up in an ink filler, but not limited to them.

The ink composition according to the present invention usually comprises a pigment, a pigment dispersion resin, a non-aqueous ambient temperature non-volatile liquid removal agent and a non-aqueous ambient temperature volatile organic solvent, wherein the amount of the pigment dispersion resin is from 2 to 10% by weight based on the amount of the pigment. The more preferable amount of the pigment dispersion resin is less than 4.5%. Even more preferably, the amount of the pigment dispersion resin is present in an amount within the range of from 3 to 4.5%.

In the ink composition according to the present invention, the amount of the pigment dispersion resin to that of the pigment is significantly lower compared to a conventional ink composition. Therefore, handwriting applied using the ink composition according to the present invention results in pigment particles each wrapped by a pigment dispersion resin and a removable agent, unlike a handwriting applied using a conventional ink composition which forms a removal agent layer of a non-aqueous ambient temperature non-volatile liquid removal agent on a writing board resulting in a film-like pigment dispersion resin layer on the removal agent layer. Thus, the handwriting of the present invention becomes a point or almost point contact with the surface of a writing board. Throughout this description, the terms "point or almost point" denotes handwritings formed by not only an almost perfect or perfect layer like grains which touch the surface of the writing board at specific point (i.e., like at a tangent of a sphere), but also a relative layer-like grains which touch the surface of the writing board at more than one point (i.e., like at a surface of an oval-shaped grain) are included in the present invention.

When a non-aqueous ambient temperature volatile organic solvent is volatilized after application on a writing board having a porous surface like a writing board coated with a melamine layer, the remaining ink composition will be formed on a surface of the writing board as if grains of sand are spread on the surface, wherein a removal agent is disposed between and on the fine-grains. Thus, the layer-like fine-grains can be removed by an eraser made of felt, or the like, as if they are removed by a bulldozer.

In accordance with the present invention, a non-aqueous ambient temperature non-volatile liquid removal agent appears to be retained between the layer-like fine-grains, even if a handwriting is left for a few weeks after application, to prevent causing diffusion of the removal agent into the writing board. As a consequence, the handwriting can easily be erased using conventional erasers such as those described above. Further, a clear handwriting can be obtained because it is composed of layer-like fine-grains which expedite diffusion reflection of light to improve the opacifying effect by chalking.

Preferred embodiments of the present invention will now be described, in detail, with reference to the accompanying drawings and following examples.

EXAMPLE 1

The following pigment dispersion resin was dissolved in the following non-aqueous ambient temperature volatile organic solvent. Then, the pigment particles described below, nonaqueous ambient temperature non-volatile liquid removal agent and other additives were added thereto and premixed by a desper, etc. Subsequently, they were dispersed by using a bead mill. Thus, ink compositions in embodiment 1 were obtained. The individual mixing amounts are shown by weight percent.

Each ink was directly filled in an ink filler of so-called 'ink free type' writing tool having a ink absorbing pen point used for a colored writing board. Each ink was a yellow colored fluorescent ink used for a colored writing board.

By using this writing tool, a time-erasion performance and an opacifying rate of each ink were measured. The results are shown as follows. Each evaluation was made by shuttling five times a 5×5 cm eraser made of felt on a colored writing board coated with a melamine layer. The criterion is as follows. The comparison examination was also done for the comparison.

Evaluation A: handwriting was erased under 100 g load of the eraser.

Evaluation B: handwriting was erased under 200 g load of the eraser.

Evaluation C: handwriting was erased under 400 g load of the eraser.

Evaluation D: handwriting was erased under 800 g load of the eraser.

Evaluation E: handwriting was erased by shuttling ten times the eraser under 1000 g load thereof.

| Sample Nos. | Reference-1 | Invention-1 |
|---|---|---|
| titanium | 4.8 | 4.8 |
| fluorescence yellow pigment (fluorescent pigment, brand name: 'EPOCOLOR FP300' made by NIPPON SHOKUBAI Kagaku Kogyo Co.,Ltd) | 16.8 | 16.8 |
| PVB (brand name: 'DENKA Butyral 2000L' made by DENKI KAGAKU KOGYO Co.,Ltd) | 2.4 | 0.9 |
| isopropyl alcohol | 21 | 21 |
| ethanol | 46 | 47.5 |
| cetyl isooctanoate (brand name: 'NIKKOL CIO' made by NIKKO Chemicals Co.,Ltd) | 3 | 3 |
| polyoxyethylene alkyl ether sulfuric acid salt (brand name: 'Hitenol 08E' made by DAI-ICHIKOGYO SEIYAKU Co.,Ltd) | 6 | 6 |
| erasion performance | | |
| just after written | B | A |
| one month later in room temperature | E | A |
| opacifying ratio | 28% | 39% |

Figure 3:
FIG. 3 is a micrograph at 250 magnification showing a surface of a writing board, where the pigment to PVB weight ratio is 100:14.3.
Figure 5:
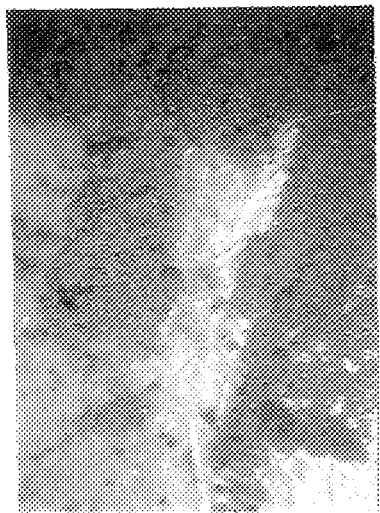
FIG. 5 is a micrograph at 250 magnification showing a surface of a writing board, where the pigment to PVB weight ratio is 100:4.2.
Figure 6:
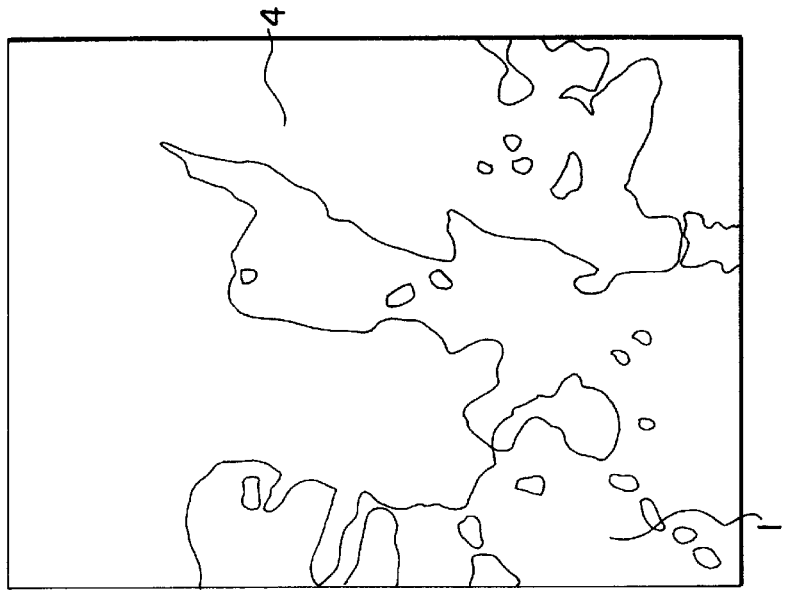
FIG. 6 is an explanatory view of FIG. 5.
Figure 4:
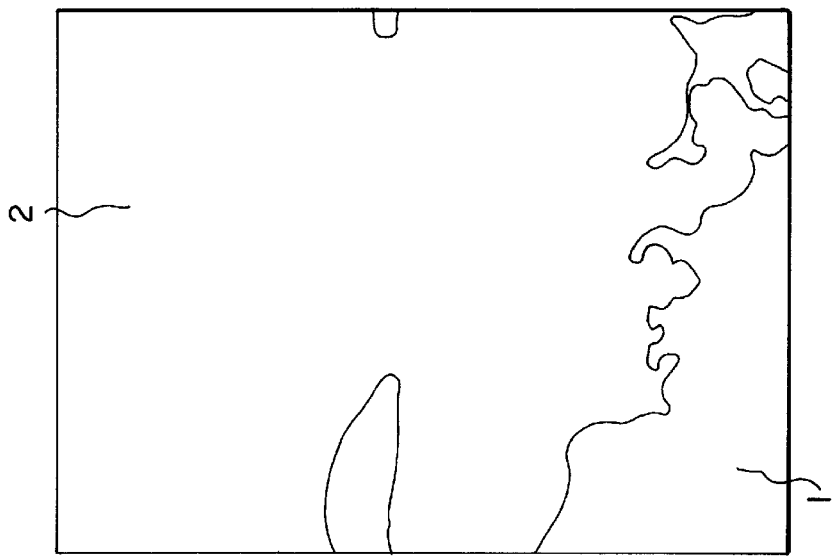
FIG. 4 is an explanatory view of FIG. 3.
Figure 2:
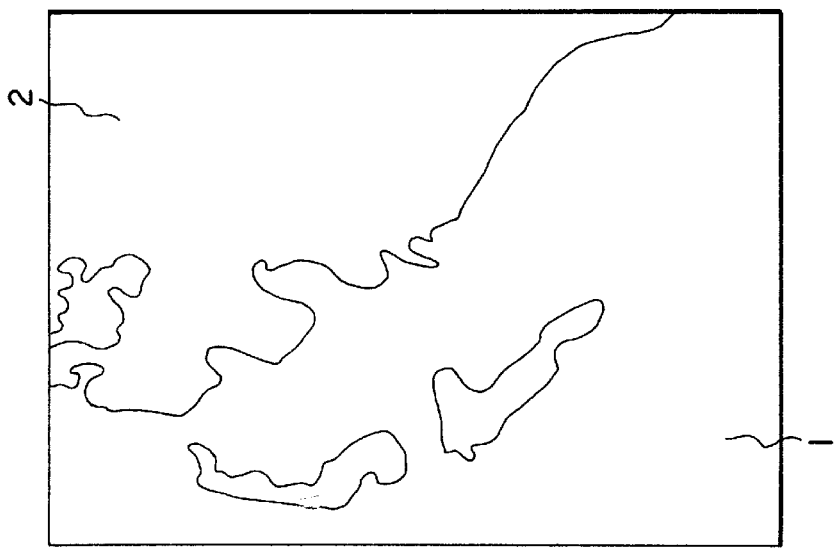
FIG. 2 is an explanatory view of FIG. 1.

Microscope photographs showing an initial erasion performance were taken. FIG. 1 is a micrograph, when the pigment to PVB weight ratio was 100:100 (almost all conventional writing tools used for a white writing board fall within this ratio). FIG. 2 is an explanatory view of FIG. 1. FIG. 3 is a micrograph, when the pigment to PVB weight ratio was 100:14.3 (corresponding to Sample No. Reference-1/for a black colored writing board). FIG. 4 is an explanatory view of FIG. 3. FIG. is a micrograph, when the pigment to PVB weight ratio was 100:4.2 (corresponding to Sample No. Invention-1/for a black colored writing board). FIG. 6 is an explanatory view of FIG. 5. Each figure is a plain view showing, when stopped erasing, an erased part and a non-erased part of the handwriting. Each microscope photograph is taken by a color video microscope with photo fiber and 250 magnification lenses and made by using a color video copier (Mitusbishi Electric Corp.: SCT-CP150).

Figure 7:
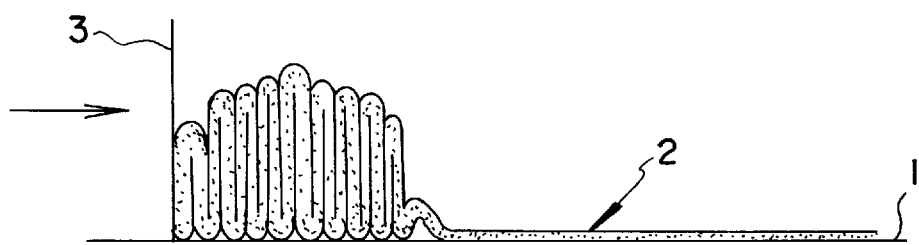
FIG. 7 is a side view of a handwriting layer when being erased, where the pigment to PVB weight ratio is 100:100.
Figure 8:
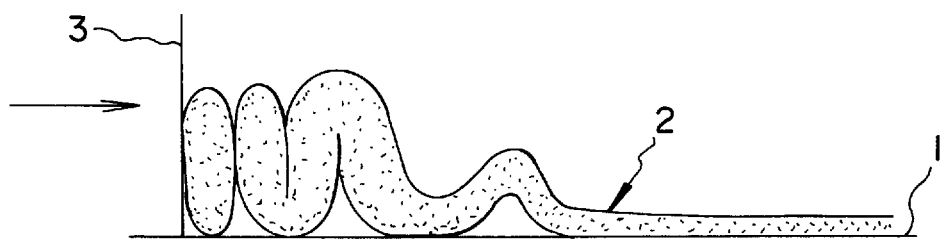
FIG. 8 is a side view of a handwriting layer when being erased, where the pigment to PVB weight ratio is 100:14.3.
Figure 9:
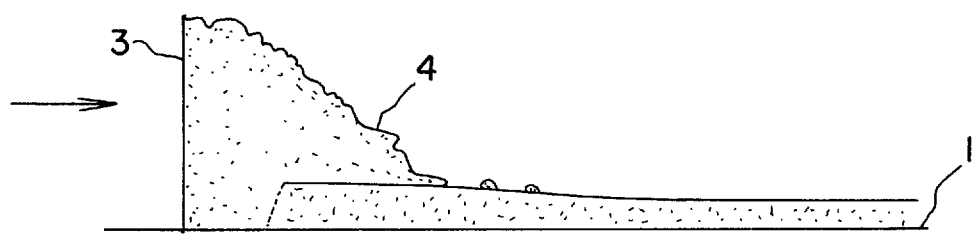
FIG. 9 is a side view of a handwriting layer when being erased, where the pigment to PVB weight ratio is 100:4.2.

FIG. 7 is a traced side view of a handwriting when being erased, where the pigment to PVB weight ratio was 100:100. FIG. 8 is a traced side view of a handwriting when being erased, where the pigment to PVB weight ratio was 100:14.3. FIG. 9 is a traced side view of a handwriting when being erased, where the pigment to PVB weight ratio was 100:4.2. In FIGS. 2, 4, 6, 7, 8 and 9, the numeral 1 denotes a writing surface of a writing board coated with a melamine layer, 2 denotes a layer showing a handwriting, 3 denotes a surface of an eraser made of felt, 4 denotes a fine-grains showing a handwriting.

When the pigment to PVB weight ratio was 100:100, a handwriting was apparently made of a film-like coating and pushed to be erased by an eraser 3 with the coating 2 slipping on a writing surface 1 and folding as shown in FIG. 7. When the pigment to PVB weight ratio was 100:14.3 in sample No. Reference-1, a handwriting was made of a porous fragile coating and pushed to be erased by an eraser 3 with the coating 2 folding, the folded coating is torn off in the place in which it grew to some degree, as shown in FIG. 8. When the pigment to PVB weight ratio was 100:4.2, a handwriting was erased by being pushed by an eraser 3 as if grains of sand (fine-grains 4) are pushed by a bulldozer, as shown in FIG. 9.

It is understood from the above that each pigment particle of the present inventive ink composition is wrapped by a pigment dispersion resin and a removable agent surrounding thereto and thus, the fine-grains of the handwriting can form a point contact with a surface of the writing board.

EXAMPLE 2

The time-erasion performance and opacifying rate of white inks each having the following composition obtained by the same process as described in example 1, were measured. The results are shown as follows.

| Sample Nos. | Reference-2 | Invention-2 |
|---|---|---|
| titanium | 21.0 | 21.0 |
| PVB (brand name: 'S-LEC BL-1' made by SEKISUI Chemical Co.,Ltd) | 3.6 | 0.9 |
| polyoxyethylene alkyl ether sulfuric acid salt (brand name: 'Hitenol 08E' made by DAI-ICHIKOGYO SEIYAKU Co.,Ltd) | 1.5 | 1.5 |
| butyl isostearate (brand name: 'NIKKOL BIS' made by NIKKO Chemicals Co.,Ltd) | 6.0 | 6.0 |
| isopropyl alcohol | 20.0 | 20.0 |
| ethanol | 49.7 | 50.6 |
| erase characteristic one month later in room temperature | E | B |
| opacifying ratio | 30% | 47% |

EXAMPLE 3

The time-erasion performance characteristic and opacifying rate of an orange fluorescent inks each having the following composition obtained by the same process as described in example 1, were measured. The results are shown as follows.

| Sample Nos. | Reference-3 | Invention-3 |
|---|---|---|
| orange fluorescent pigment (brand name: 'EPOCOLOR FP40' made by NIPPON SYOKUBAI Kagaku Kogyo Co.,Ltd) | 18.4 | 18.4 |
| PVB (brand name: 'Denka Butyral 2000L' made by DENKI KAGAKU KOGYO Co.,Ltd) | 2.1 | 0.7 |
| POP/POE block copolymer (brand name: 'PURURONIKKU L-61' made by ASAHI DENKA KOGYO Co.,Ltd) | 10.0 | 10.0 |
| cetyl isooctanate (brand name: 'NIKKOL CIO' made by NIKKO Chemicals Co.,Ltd) | 3.0 | 3.0 |
| isopropyl alcohol | 25.0 | 25.0 |
| ethanol | 41.5 | 42.9 |
| erase characteristic one month later in room temperature | E | A |
| opacifying ratio | 30% | 47% |

EXAMPLE 4

The time-erasion performance and opacifying rate of pink fluorescent inks each having the following composition obtained by the same process as described in example 1, were measured. The results are shown as follows.

| Sample No. | Invention-4 |
|---|---|
| titanium | 4.0 |
| pink fluorescent pigment (fluorescent pigment, brand name: 'EPOCOLOR FP2050N' made by NIPPON SHOKUBAI Kagaku Kogyo Co.,Ltd) | 17.8 |
| PVB (brand name: 'S-LEC BL-1' made by SEKISUI Chemical Co.,Ltd) | 0.8 |
| polyoxyethylene alkyl ether phosphate (brand name: 'Plysurf A-207H' made by DAI-ICHIKOGYO SEIYAKU Co.,Ltd) | 1.5 |
| cetyl isooctanoate (brand name: 'NIKKOL CIO' made by NIKKO Chemicals Co.,Ltd) | 7.0 |
| isopropyl alcohol | 30.0 |
| ethanol | 38.9 |
| erase characteristic one month later in room temperature | B |
| opacifying ratio | 44% |

EXAMPLES 5 and 6

The time-erasion performance and opacifying rate of blue fluorescent inks each having the following composition obtained by the same process as described in example 1, were measured. The results are shown as follows.

| Sample Nos. | Invention-5 | Invention-6 |
|---|---|---|
| titanium | 10.8 | — |
| P. Blue (C.I.No.;74160, brand name: 'Cyanine Blue 4938' made by DAINICHISEIKA Color & Chemicals MFG Co.,Ltd) | 3.0 | 3.5 |
| PVB (brand name: 'S-LEC BL-1' made by SEKISUI Chemical Co.,Ltd) | 0.6 | 0.3 |
| polyoxyethylene alkyl ether phosphate (brand name: 'Plysurf A-207H' made by DAI-ICHIKOGYO SEIYAKU Co.,Ltd) | 3.0 | 3.0 |
| trimethylolpropane triester (brand name: 'Unister H-3334R' made by NIPPON Oil & Fats Co.,Ltd) | 8.5 | 8.5 |
| isopropyl alcohol | 20.0 | 20.0 |
| ethanol | 54.1 | 64.7 |
| erase characteristic one month later in room temperature | C | C |
| opacifying ratio | 32% | 23% |

EXAMPLES 7 and 8

The time-erasion performance and opacifying rate of red inks each having the following composition obtained by the same process as described in example 1, were measured. The results are shown as follows.

| Sample Nos. | Invention-7 | Reference-4 |
|---|---|---|
| titanium | 6.3 | 6.3 |
| P. Red (C.I.No:254 brand name: 'CROMOPHTAL DPP RED BP' made by CIBA-GEIGY Co.,Ltd) | 2.0 | 2.0 |
| PVB (brand name: 'DENKA Butyral 2000L' made by DENKI KAGAKU KOGYO Co.,Ltd) | 0.8 | 4.3 |
| polyoxyethylene alkyl ether sulfuric acid salt (brand name: 'Hitenol 08E' made by DAI-ICHIKOGYO SEIYAKU Co.,Ltd) | 2.0 | 2.0 |
| isopropyl isooctanate (brand name: 'NIKKOL' made by NIKKO Chemicals Co.,Ltd) | 8.0 | 8.0 |
| isopropyl alcohol | 25.0 | 25.0 |
| ethanol | 55.9 | 52.4 |
| erase characteristic one month later in room temperature | B | impossible to erase |
| opacifying ratio | 37% | 18% |

| Sample Nos. | Invention-8 | Reference-5 |
|---|---|---|
| titanium | — | — |
| P. Red (C.I.No:254 brand name: 'CROMOPHTAL DPP RED BP' made by CIBA-GEIGY Co.,Ltd) | 4.0 | 4.0 |
| PVB (brand name: 'DENKA Butyral 2000L' made by DENKI KAGAKU KOGYO Co.,Ltd) | 0.3 | 4.0 |
| polyoxyethylene alkyl ether phosphate (brand name: 'Plysurf A-207H' made by DAI-ICHIKOGYO SEIYAKU Co.,Ltd) | 2.0 | 2.0 |
| propyleneglycol didecanoate (brand name: 'NIKKOL PDD' made by NIKKO Chemicals Co.,Ltd) | 8.0 | 8.0 |
| isopropyl alcohol | 25.0 | 25.0 |
| ethanol | 60.7 | 57.0 |

-continued

| | | |
|---|---|---|
| erase characteristic one month later in room temperature | B | impossible to erase |
| opacifying ratio | 29% | 14% |

EXAMPLES 9 and 10

The time-erasion performance and opacifying rate of the yellow and the red inks each having the following composition obtained by the same process as described in example 1, were measured. The results are shown as follows.

| Sample Nos. | Invention-9 | Invention-10 |
|---|---|---|
| titanium | 5.0 | 6.0 |
| yellow fluorescent pigment (fluorescent pigment, brand name: 'EPOCOLOR FP300' made by NIPPON SHOKUBAI KAGAKU KOGYO Co.,Ltd) | 18.0 | — |
| P. Red (C.I.No.254 brand name: 'CROMOPHTAL DPP RED BP' made by CIBA-GEIGY Co.,Ltd) | — | 3.8 |
| vinylacetate-ethylene copolymer (brand name: 'Soarlex R-FH', vinyl acetate 87%, made by NIPPON Synthetic Chemical Industry Co.,Ltd) | 1.0 | — |
| vinylacetate-ethylene copolymer (brand name: 'Soarlex R-FH', vinyl acetate 55%, made by NIPPON Synthetic Chemical Industry Co.,Ltd) | — | 0.4 |
| methyl isobutyl ketone | — | 62.8 |
| ethyl alcohol | 54.0 | — |
| propylene glycol monomethyl ether | — | 15.0 |
| isopropyl alcohol | 10.0 | — |
| isooctyl stearate (brand name: 'NIKKOL ISO' made by NIKKO Chemicals Co.,Ltd) | 6.0 | 5.5 |
| polyoxyethylene alkyl ether phosphate (brand name: 'Plysurf A-2A2C', made by DAI-ICHIKOGYO SEIYAKU Co.,Ltd) | 3.0 | 4.0 |
| trimethylolpropane triester (brand name: 'Unister H334R' made by NIPPON Oil & Fats Co.,Ltd) | 3.0 | 2.5 |
| erase characteristic one month later in room temperature | B | C |
| opacifying ratio | 37% | 34% |

As will be seen from the foregoing results given above, if the amount of the pigment dispersion resin to that of the pigment is from about 2 to about 10% by weight, both the time-erasion performance and opacifying effect will be improved. Advantageously, when the amount of the pigment dispersion resin to that of the pigment is from about 3 to about 4.5% by weight, the time-erasion performance is evaluated as 'A' which means that a remarkable time-erasion performance has been accomplished. Also, since the pigment density of the ink according to the present invention is low, the spreading performance of the ink is excellent.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention.

What is claimed is:
1. An ink composition, comprising:
   a pigment;
   a pigment dispersion resin;
   an non-aqueous ambient temperature non-volatile liquid removal agent; and
   an non-aqueous ambient temperature volatile organic solvent, wherein said pigment dispersion resin is present in an amount, relative to that of said pigment, within the range of from about 2 to about 10% by weight.
2. An ink composition as claimed in claim 1, wherein said pigment dispersion resin is present in an amount, relative to that of said pigment, of from about 3 to about 4.5%.
3. An ink composition as claimed in claim 1, wherein said pigment dispersion resin is a polyvinyl butyral (PVB) resin.
4. An ink composition as claimed in claim 1, wherein said pigment dispersion resin is a vinyl acetate-ethylene copolymer.
5. An ink composition as claimed in claim 1, wherein said non-aqueous ambient temperature non-volatile liquid removal agent is selected from the group consisting of a fatty acid ester, a polyoxypropylene compound and a surfactant.
6. An ink composition as claimed in claim 1, wherein said non-aqueous ambient temperature non-volatile removal liquid agent is present in an amount, relative to that of said pigment in the range of from about 20 to about 300% by weight.
7. An ink composition as claimed in claim 1, wherein said non-aqueous ambient temperature volatile organic solvent comprises an alcohol solvent.
8. An ink composition as claimed in claim 1, wherein said non-aqueous ambient temperature volatile organic solvent comprises a ketone solvent.
9. A method of making an ink composition comprising:
   dissolving a pigment dispersion resin in an non-aqueous ambient temperature volatile organic solvent to form a solution; and
   adding to this solution a pigment particle and an non-aqueous ambient temperature non-volatile liquid removal agent to form an ink composition;
   whereby said pigment dispersion resin is present in an amount, relative to that of said pigment, within the range of from about 2 to about 10% by weight.
10. The method as claimed in claim 9, wherein said ink composition further is dispersed using a dispersion means.
11. The method as claimed in claim 10, wherein said dispersion means is selected from the group consisting of a bead mill, roller mill and ball mill.
12. The method as claimed in claim 9, wherein said pigment dispersion resin is present in an amount, relative to that of said pigment, of from about 3 to about 4.5%.
13. The method as claimed in claim 9, wherein said pigment dispersion resin is a polyvinyl butyral (PVB) resin.
14. The method as claimed in claim 9, wherein said pigment dispersion resin is a vinyl acetate-ethylene copolymer.
15. The method as claimed in claim 9, wherein said non-aqueous ambient temperature non-volatile liquid removal agent is selected from the group consisting of a fatty acid ester, a polyoxypropylene compound and a surfactant.
16. The method as claimed in claim 9, wherein said non-aqueous ambient temperature non-volatile removal liquid agent is present in an amount, relative to that of said pigment in the range of from about 20 to about 30% by weight.

* * * * *